Jan. 7, 1969 J. Z. JACOBY ET AL 3,420,960

APPARATUS AND METHOD FOR TELEPHONE LINE SCANNING

Filed May 14, 1965 Sheet 1 of 3

INVENTORS J. Z. JACOBY
F. S. VIGLIANTE

BY M J Rackman

ATTORNEY

United States Patent Office 3,420,960
Patented Jan. 7, 1969

3,420,960

APPARATUS AND METHOD FOR TELEPHONE LINE SCANNING

John Z. Jacoby, Murray Hill, and Frank S. Vigliante, Piscataway Township, Middlesex County, N.J., assignors to Bell Telephone Laboratories, Incorporated, New York, N.Y., a corporation of New York Filed May 14, 1965, Ser. No. 455,887
U.S. Cl. 179—18 18 Claims
Int. Cl. H04m 3/00

ABSTRACT OF THE DISCLOSURE

Telephone line scanning arrangements are disclosed wherein dial pulse, off-hook, and on-hook scans are made at different periodic intervals. A last-look bit and a present state bit are stored in memory while the dial pulse information is stored in appropriate registers. The present state bit are stored in memory while the dial pulse ininformation to evaluate the information and distinguish between them. The present state bit is forced to an arbitrary value after each on-hook scan regardless of the actual present state of the line, the arbitrary value being an assumption which is then evaluated in order to distinguish between dial pulse transitions and idle lines. Both wired logic and stored program control are disclosed.

This invention relates to telephone systems and more particularly to apparatus and methods for scanning telephone lines.

In addition to voice signals, telephone lines and trunks carry switching information. There are many types of switching information which may be transmitted over a telephone line and the information may be in many different forms. The most widely used method to convey switching information over a telephone line is by changing the magnitude of the direct current in the line. When a line is busy a direct current flows through it; when it is idle no current flows. Dial pulses are transmitted over the line by causing the direct current to stop flowing for a predetermined time interval for each pulse.

In many telephone systems the various types of switching information are detected by different circuits. A first mechanism detects a service request when the line first goes from on-hook to off-hook. The line is then transferred to a second mechanism which detects dial pulses. Still a third mechanism detects hang-ups. In some of the newer electronic telephone switching systems all of the switching information on the line is determined not by separate units but rather by a single scanner. The scanner scans all of the lines in succession to determine the required information.

In actuality the scanner examines a scan point associated with each line. The scan point may be at ground potential if the line is off-hook and at a positive potential if the line is on-hook. Since a scan point can be in one of only two states the scanner may only determine whether the respective line is on-hook or off-hook. This information in itself is not sufficient to distinguish between service requests, dial pulses and hang-ups. An on-hook line may represent a hang-up, an idle line or a dial pulse. An off-hook line may represent a service request, a busy line or the interpulse interval between two dial pulses transmitted on the line. Consequently, in the prior art it has been known to utilize a last-look bit associated with each line. The present state of the line is compared with the last-look bit and from the comparison some of the ambiguity may be resolved. However this, too, is not sufficient. For example, suppose the last-look bit indicates that the line was previously off-hook and the scan point indicates that the line is now on-hook. A transition has definitely taken place since the last scan but the transition may be a result of the calling party having hung up or a result of his having transmitted a dial pulse. For this reason prior art line scanners have often included specially designed timing circuits. An on-hook indication, for example, is not treated as a hang-up unless it persists for a predetermined time interval. The timing circuitry required increases the cost of the scanning mechanism. Furthermore, if the timing circuitry is not physically connected to the line and instead is responsive to scan point indications in successive cycles, precautions must be taken that a series of on-hook indications which are in reality a series of dial pulses are not mistaken for a hang-up, i.e., one long continuous period of time during which the line is on-hook.

It is a principal object of this invention to provide improved apparatus and methods for determining service request, dial pulse and hang-up information transmitted over a telephone line from only on-hook and off-hook indications represented by a respective scan point.

In our invention each line, trunk, etc. is associated with two bits retained in a memory. One of these bits is a last-look (LL) bit which is a 0 if the last transition detected during a scan was a transition from the busy state to the idle state and which is a 1 if the last transition was in the opposite direction. The second bit associated with the line is a present state (PS) bit which is a 0 to indicate an off-hook line and a 1 to indicate an on-hook line. As will become apparent below the PS bit is artificial in that it does not truly represent the physical condition of the line as does the LL bit.

Three types of scans are performed—off-hook, dial pulse and on-hook. The off-hook scan compares the present state of the scan point with the associated LL and PS bits to determine if the respective line has gone from on-hook to off-hook; the change represents a transition from an idle to a busy state, i.e., a service request. The on-hook scan similarly operates on the same two items of information, but in a different manner, to detect a transition from a busy to an idle state, i.e., a hang-up. During both of these scans if the idle or busy condition of the line has changed the LL bit is up-dated to reflect the new line condition. The dial pulse scan is in the main part independent of the other two scans. The dial pulse scan is rapid enough to detect all transitions in the line from on-hook to off-hook and vice versa. The transitions are registered for counting the dial pulses. The dial pulses are not counted of course until after a service request is detected, nor are they counted after a hang-up is detected in the midst of dialing or after the line is connected through the telephone switching network to the called line.

The on-hook and off-hook scans continuously update the value of the LL bit stored in the memory. The major interaction between the dial pulse scan and the other two scans is that the dial pulse scan, which does not utilize the PS bit, nevertheless up-dates it in certain cases. The use of the PS bit, in addition to a last-look bit, and the control of the value of this bit by the dial pulse scan which does not even utilize the bit for information purposes, enable all ambiguities to be resolved. By merely determining the present on-hook or off-hook state of the line, without utilizing any time-out circuitry, it is possible to distinguish between hang-ups, idle lines and dial pulses, and to distinguish between service requests, busy lines and interpulse intervals.

It is a feature of this invention to provide two bits, last-look and present state, associated with each line to be scanned.

It is another feature of this invention to determine the present state of the line (on-hook or off-hook), and to compare the present state of the line with the respective last-look bit to determine transitions from the busy to the idle state and vice versa.

It is another feature of this invention to up-date the last-look and present state bits in accordance with the results of each scan.

It is another feature of this invention to scan the line for dial pulses, i.e., successive changes from on-hook to off-hook and vice versa.

It is still another feature of this invention to change the present state bit associated with each line to a predetermined value independent of the state of the respective line once in each complete scanning cycle and to change the present state bit to the opposite value if during a dial pulse scan it is determined that the line is in a predetermined state.

Further objects, features and advantages of the invention will become apparent upon consideration of the following detailed description in conjunction with the drawing in which.

Figure 1:
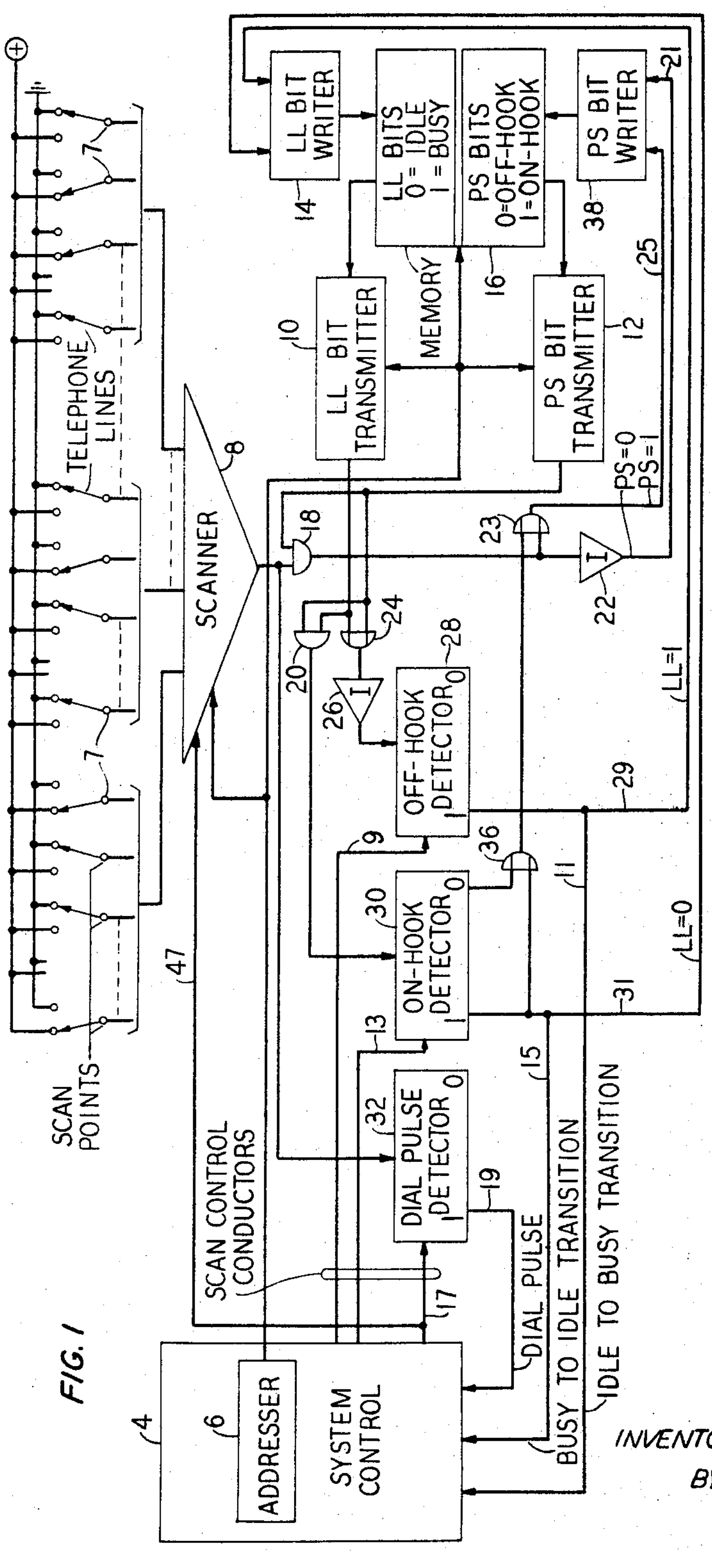
FIG. 1 is a schematic representation of an illustrative embodiment of our invention.

In FIG. 1 there are shown a plurality of scan points 7. Each of these scan points is connected to a telephone line and its potential is determined by the state of the line. In the drawing the connections and the lines themselves are shown only symbolically. Each switch may be placed in one of two positions to apply either a ground potential (a 0) or a positive potential (a 1), to the respective scan point. A 0 is an indication that the line is off-hook and a 1 is an indication that the line is on-hook. Scanner 8 examines a group of scan points at the same time. For the sake of simplicity, the system of FIG. 1, except for scanner 8, is shown to operate on only one line at a time. By duplicating some of the equipment and operating on data words rather than on data bits all of the operations to be described below may be performed on a group of lines simultaneously. The concept of group scanning is well known in the art, and our invention may be best understood by considering only a single line.

The system operation is governed by system control 4. The system control determines the required switching connections through the telephone system (not shown) and supervises calls once they are established. The purpose of the logic circuitry of FIG. 1 is to perform a limited function in an overall system, namely, to scan lines identified by the system control for three types of information. The system control includes an addresser 6. The address transmitted from this unit to the individual circuits of FIG. 1 represents a particular group of lines to be scanned, although as explained above, the invention may be best understood by considering the address as identifying a single line or scan point. The system control also determines which type of scan is to be performed. If conductor 9 is energized the off-hook scan takes place. This scan determines not whether the line which is being examined is off-hook but whether the line has gone from on-hook to off-hook to originate a service request. If the transition has been made conductor 11 is energized to notify system control 4 of the service request. If conductor 13 is energized the on-hook scan takes place. The line being scanned is examined not to determine whether it is on-hook but rather whether it has gone from off-hook to on-hook before dialing has been completed, i.e., whether the calling party has hung up. If such is the case conductor 15 is energized to notify system control 4. When conductor 17 is energized the scan is for dial pulses. If conductor 19 is energized system control 4 is notified that the line is on-hook, i.e., a dial pulse has been detected. This dial pulse is registered. Subsequent energizations of conductor 19 are not interpreted as dial pulses until after the conductor is found to be de-energized during a dial pulse scan. In this manner only the first energization of conductor 19 in a series of energizations is interpreted as a dial pulse. This is necessary because the same line may be scanned twice during receipt of a single dial pulse. The mechanism in system control 4 for registering dial pulses may be any one of many well-known in the art. The reason for including dial pulse detector 32 in the circuit of FIG. 1, as will be explained below, is to resolve ambiguities which would otherwise arise during the on-hook scans.

Figure 2:
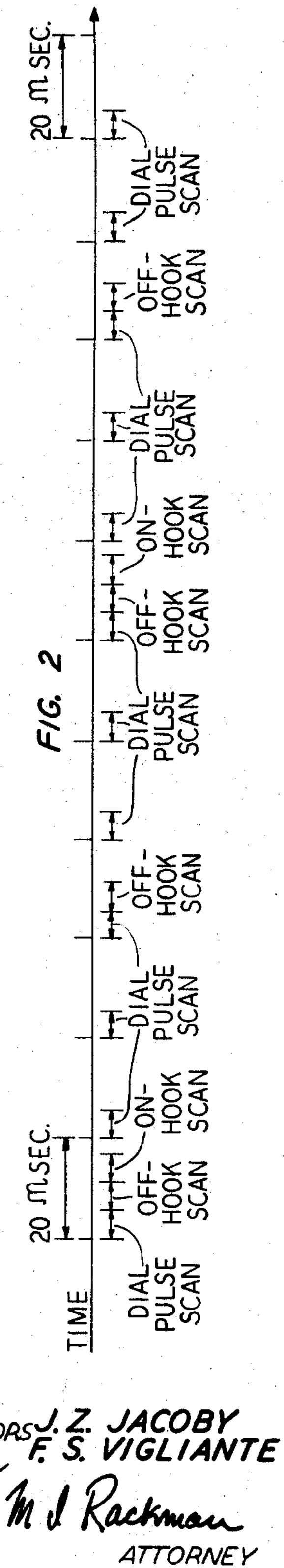
FIG. 2 is a timing diagram which indicates the time intervals during which various scans in the system of FIG. 1 are performed.

FIG. 2 shows the time intervals during which the three types of scans are performed. A dial pulse scan takes place at the beginning of every successive 20-millisecond interval. Each line is scanned once every 20 milliseconds for an on-hook indication. A relatively fast rate is required for the dial pulse scan since no dial pulses may be missed. The off-hook scan follows the dial pulse scan in every third 20-millisecond interval. The off-hook scan is thus performed at a 60-millisecond rate. Hang-ups need not be detected as fast as service requests and consequently fewer on-hook scans are performed than off-hook scans. An on-hook scan takes place only once in every 120 milliseconds.

The PS bit when a 0 represents an off-hook condition, and when a 1 represents an on-hook condition. At the beginning of each 20-millisecond interval the dial pulse scan causes the PS bit in memory 16 to be up-dated. AND gate 18 forms the logical product of the old PS bit and the scan point indication (a 0 for off-hook and a 1 for on-hook). The respective address is sent to memory 16 and PS bit transmitter 12, and the old PS bit is transmitted to one input of AND gate 18. The energization of conductors 17 and 47 during the dial pulse scan enables scanner 8, and the bit representing the state of the line being scanned is transmitted to the other input of gate 18 by the scanner. The truth table defining the AND gate operation is as follows:

| Old PS bit | Scan point condition | New PS bit |
|---|---|---|
| (line off-hook) | 0 (line off-hook) | 0 |
| (line off-hook) | 1 (line on-hook) | 0 |
| (line on-hook) | 0 (line off-hook) | 0 |
| (line on-hook) | 1 (line on-hook) | 1 |

If the output of AND gate 18 is de-energized (a 0), inverter 22 energizes conductor 21. When this conductor is energized PS bit writer 38 is notified that a 0 should be written for the PS bit at the location represented by the address transmitted to memory 16. If the output of AND gate 18 is a 1 the signal is transmitted through OR gate 23 to energize conductor 25. The energization of this conductor notifies bit writer 38 that the new PS bit is a 1. In either case the PS bit in memory 16 is up-dated.

The off-hook scan occurs in every third 20-millisecond interval and utilizes the PS bit up-dated in the immediately preceding dial pulse scan. Referring to the truth table shown above it is noted that in the first two cases a transition from an on-hook to an off-hook condition should not be detected since the old PS bit indicates that the line was previously off-hook. Similarly, a transition indication should not result in the fourth case since the line was previously on-hook and still is. Only in the third case where the line was previously on-hook and is now off-hook should a transition be indicated. The transition is detected by longically ORing the PS bit with the LL (last-look) bit associated with the line and complementing the result. If the final bit is a 1 it is an indication that a transition has occurred from on-hook to off-hook. The LL bit is a 0 if it was determined during a previous on-hook scan that the line was on-hook and it is a 1 if it was determined during a previous off-hook scan that the line was off-hook. In the first two cases since the old PS bit was a 0 indicating that the line was off-hook the LL bit must be a 1. Consequently, the function PS+LL, 0+1, is a 1 and the complement of this value is a 0. A transition is therefore not detected. In the fourth case the up-dated PS bit is a 1 and even if the LL bit is a 0, the function PS+LL is a 1 and its complement is a 0. The transition from on-hook to off-hook is detected only in the third case. The PS bit is now a 0 if the line was determined to be off-hook during the dial pulse scan. The LL bit is a 0 if the line was previously on-hook. The function PS+LL is a 0, its complement is a 1 and the on-hook to off-hook transition is indicated.

The complement of the function PS+LL is formed as follows. The PS bit is applied as one of the inputs to OR gate 24. The LL bit associated with the line is sent by transmitter 10 to the other input of OR gate 24. The output of OR gate 24 thus represents the function PS+LL. The value of the function is inverted by inverter 26 and is applied to off-hook detector 28. If the complement of the function is a 1 the 1 output of the detector is energized, since detector 28 is operated by the energization of conductor 9 during the off-hook scan. This output is connected to conductor 11 and system control 4 is notified of the service request.

In addition to notifying the system control of the service request it is necessary to up-date the LL bit in memory 16. Conductor 29 is energized if a service request is detected. When this conductor is energized LL bit writer 14 is notified to write a 1 in the LL bit in memory 16 associated with the line whose address is transmitted to the memory by addresser.

The LL bit is up-dated and changed from a 0 to a 1 when a transition to off-hook is indicated. The previously up-dated PS bit remains a 0. This is the desired result because the line is now off-hook. It is important to note that because the LL bit is now changed to a 1 no new on-hook to off-hook transitions can be detected for the line even though the line switches between on-hook and off-hook states during dialing. The LL bit may be made a 0 only as a result of an on-hook scan or by system control 4, by circuitry not shown in the drawing, after dialing is completed and the line is released. The PS bit is made a 1 during the on-hook scan as will be seen below. Thus during a subsequent off-hook scan the new PS bit may once again be a 1. However, because the LL bit remains a 1 until hang-up or until the call is established, an on-hook to off-hook transition will not be detected erroneously.

Three dial pulse scans take place between successive off-hook scans. The PS and LL bits are not used during these scans. Conductor 17 is energized and operates dial pulse detector 32. If the line being scanned is on-hook the 1 output of the detector is energized to notify system control 4 over conductor 19 that the line is on-hook. Although the dial pulse scan does not utilize the PS and LL bits, as described above it does control the writing of a 0 in the PS bit location memory 16 if the line scanned is off-hook. If the line is off-hook the output of gate 18 is de-energized. A signal is transmitted through inverter 22 to conductor 21 to notify PS bit writer 38 to write a 0 in the PS bit associated with the line being scanned. This operation is necessary to insure the proper detection of a change from a busy to an idle state as will be described below.

The on-hook scan, which detects busy to idle transitions, also utilizes the PS bit up-dated during the preceding dial pulse scan. The difficulty with using the PS bit for on-hook scanning is that both dial pulse and hang-up conditions are represented by an on-hook line and the PS bit is made a 1 in both cases during the dial pulse scan. Consequently if a dial pulse is not to be taken mistakenly as an on-hook condition the on-hook scan must distinguish between the two. The on-hook scan controls the ANDing of the PS bit and the LL bit associated with the line. If the product is a 1 it is an indication that the line has gone from the busy to the idle state. The PS bit from memory 16 is applied as one of the inputs to AND gate 20. The LL bit transmitter 10 transmits the LL bit to the other input of gate 20. If both inputs are 1's the output of the gate is a 1 and on-hook detector 30, which is operated by the energization of conductor 13 during an on-hook scan, has its 1 output energized. The resulting pulse on conductor 15 notifies system control 4 of the hang-up. If the 1 output of detector 30 is energized the LL bit must be changed to a 0 to indicate that the line is now idle. Conductor 31 is connected to the 1 output of detector 30 and is energized when a transition from the busy to the idle state is detected. The energization of conductor 31 notifies LL bit writer 14 to change the LL bit in memory 16 from a 1 to a 0.

The busy to idle state transition may be detected by forming the product of the PS bit and the LL bit because in accordance with an aspect of our invention at the end of each on-hook scan the PS bit is made a 1 independent of the result of the on-hook scan. No matter which output of detector 30 is energized a pulse is transmitted through OR gate 36 and OR gate 23 to conductor 25. PS bit writer 38 is thus notified to write a 1 in the PS bit in memory 16 (even if it has written a 0 immediately before as the new PS bit). The PS bit must be made a 1 after every on-hook scan in order that the system be able to distinguish between on-hook conditions arising from dial pulses and idle lines. At the end of the on-hook scan the PS bit is always made a 1 to indicate that the line is idle. The setting of the PS bit to a 1 is artificial. The line may still be off-hook.

If during the subsequent six dial pulse scans the PS bit is not changed from a 1 to a 0 an on-hook transition will be indicated by the subsequent on-hook scan. If a line is initially off-hook its LL bit has been made a 1 during the off-hook scan which detected the transition to the busy state. If the PS bit has not been made a 0 between successive on-hook scans the product of the PS and LL bits during the second on-hook scan is a 1 and indicates that the line has gone on-hook. It is assumed at the end of every on-hook scan that the line will indeed go on-hook before the next on-hook scan. If the line does not go on-hook, in order to avoid a positive indication during the next on-hook scan it is necessary to make the PS bit a 0 so that the product of the PS and LL bits will not be a 1. It will be recalled that during the dial pulse scan the PS bit is changed from a 1 to a 0 if the line is off-hook. Although the dial pulse scan does not require the use of the PS bit, if the dial pulse scan determines that the line is off-hook the PS bit is made a 0. Once the PS bit is made a 0 it cannot be changed to a 1 during succeeding dial pulse scans. The dial pulse scan changes the PS bit from a 1 to a 0 if an off-hook condition is detected but does not change the bit to a 1 if an on-hook condition is detected. Consequently, while the PS bit is made a 1 at the end of an on-hook scan in order for an off-hook to on-hook transition to be detected during the next on-hook scan, the PS bit must remain a 1 during the intervening scans. If an off-hook condition is detected during one of the intervening dial pulse scans, i.e., the line has not yet gone on-hook, the PS bit is made a 0 and the off-hook to on-hook transition is not detected. By enabling the dial pulse scan to also change the PS bit to a 0 if an off-hook condition is detected, the PS bit in accordance with our invention is always made a 0 between the successive on-hook scans if the line is indeed still off-hook or in the dialing state. Dial pulse scans take place at a 20-millisecond rate, i.e., the line is scanned for a dial pulse once every 20 milliseconds. During dial pulsing the off-hook interval between successive pulses is typically 40 milliseconds and is always greater than at least 20 milliseconds. Consequently, during dial pulsing at least one of the six dial pulse scans between successive on-hook scans will determine that the line is off-hook, the PS bit will be made a 0 and the on-hook scan will not indicate an erroneous transition.

If the PS bit is still a 1 by the time a second on-hook scan takes place the line has indeed gone on-hook. The LL bit which is a 1, indicating that the line was previously off-hook, when ANDed with the PS bit produces a 1. System control 4 is notified that the line has gone on-hook and the LL bit is changed to a 0. The LL bit may now be used in the off-hook scan to detect when the line next goes off-hook on a new call.

The LL bit is a "last look" indication. The LL bit is used only during the off-hook and on-hook scans and may be changed only as a result of these scans. The LL bit always reflects the type of scan which last determined a transition; the LL bit represents the busy or idle condition of the line. These conditions are to be distinguished from the on-hook or off-hook states since the state of the line continuously changes during dialing. However the busy or idle condition of the line does not change during dialing and the LL bit is a true indication of whether the line is in use. The "present state" or PS bit, on the other hand, while indicating an on-hook or off-hook state is in reality an artificial bit. The primary reason that the bit is artificial is that it is always made a 1 at the end of an on-hook scan. Consequently at the end of an on-hook scan the PS bit associated with the line indicates that it is on-hook. During one of the subsequent dial pulse scans the PS bit will be made a 0 if an off-hook state is detected. However once it is made a 0 it cannot be changed back to a 1 until the end of the next on-hook scan even though during the intervening scans the line may be on-hook. Consequently the PS bit does not truly indicate the "present state" of the line. This bit is required however in order that the on-hook scan be able to distinguish between a truly idle line resulting from a hang-up and an on-hook condition which arises as a result of dial pulsing. It is to be noted that no extra precaution need be taken to insure that an off-hook scan will not mistake an off-hook condition during dialing as a line going from the idle to the busy state. During dialing the LL bit must be a 1 and dectector 28 cannot detect an on-hook to off-hook transition. The problem of ambiguity in the circuit of FIG. 1 exists only in the on-hook scan where the LL bit indicates a busy line but an on-hook state of the line (PS bit) may represent either a hang-up or a dial pulse.

The operation of the circuit of FIG. 1 may be summarized as follows. Each line has associated with it a PS bit and an LL bit. Three types of scans take place. The dial pulse scan occurs at the fastest rate, the off-hook scan occurs at an intermediate rate, and the on-hook scan occurs at the slowest rate. The dial pulse scan does not require the use of either the PS or LL bit. It does however control the writing of a 0 in the PS bit if it determines that the respective line is off-hook. The dial pulse scan, except for controlling the PS bit in this manner, is independent of the other two types of scans. The dial pulse scan modifies the PS bit only in order that the on-hook scan be able to distinguish between idle lines and on-hook lines in the dialing state. The off-hook scan forms the complement of the logical union of the PS and LL bits. If the complemented bit is a 1 it is an indication that the line has just gone off-hook, i.e., has become busy. The LL bit is made a 1 to indicate this state. In the on-hook scan the PS bit is ANDed with the LL bit and if the logical product is a 1 it is an indication that the line has gone on-hook, i.e., it has just become idle. The LL bit is changed to a 0. Independent of the result of the on-hook scan the PS bit is always made a 1 at the end of the scan.

The system of FIG. 1 shows how the method of our invention may be practiced by specially constructed circuitry, which circuitry derives the various logical functions and directly controls the required operations. The method may also be practiced in many of the electronic telephone switching systems developed in recent years. In these systems the data processing capabilities of a program-controlled machine are utilized to great advantage. By providing a suitable sequence of machine orders the method of our invention may be practiced in these systems.

Figure 3:
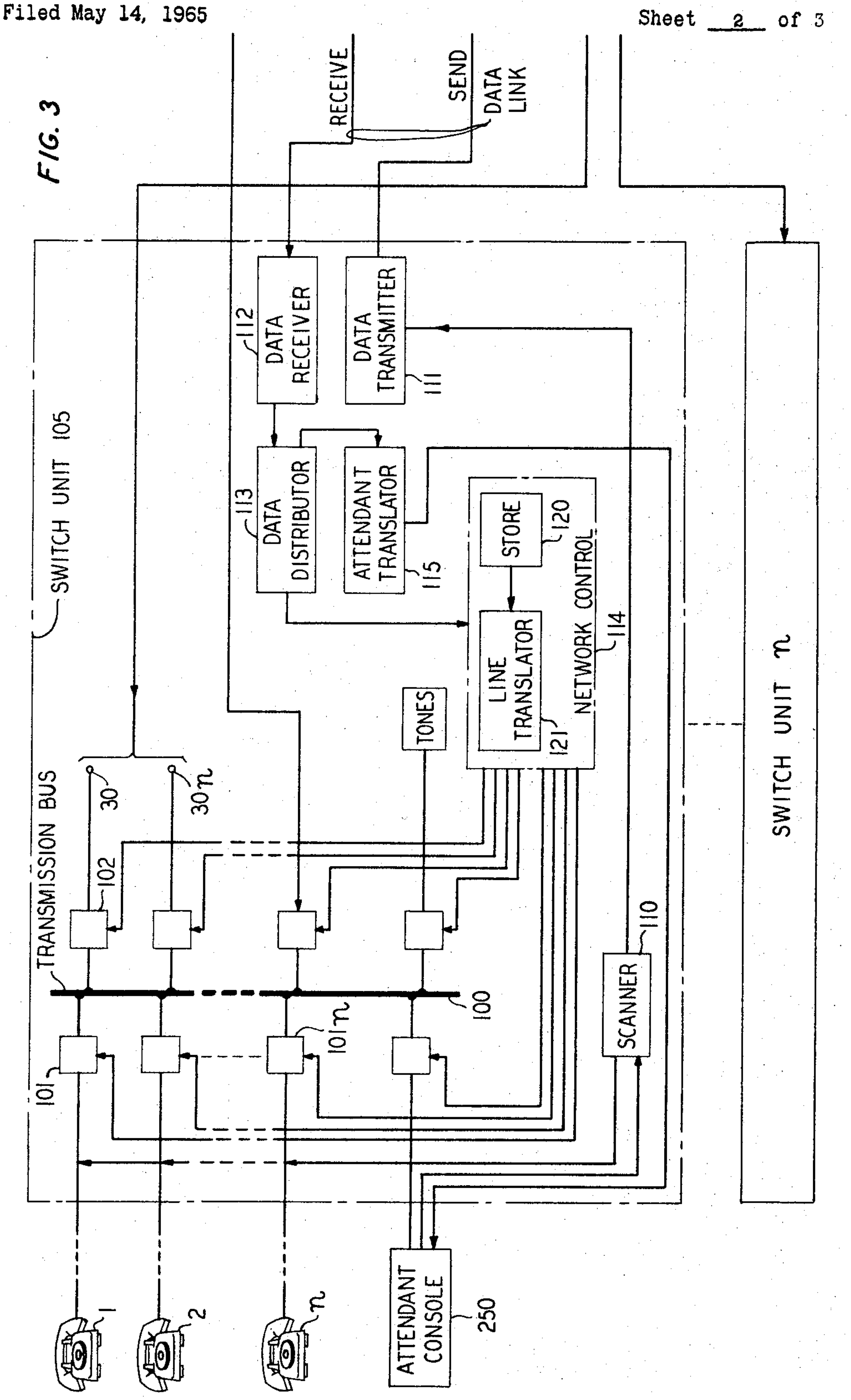
FIGS. 3 and 4 are a schematic representation of a second illustrative embodiment of our invention.
Figure 4:
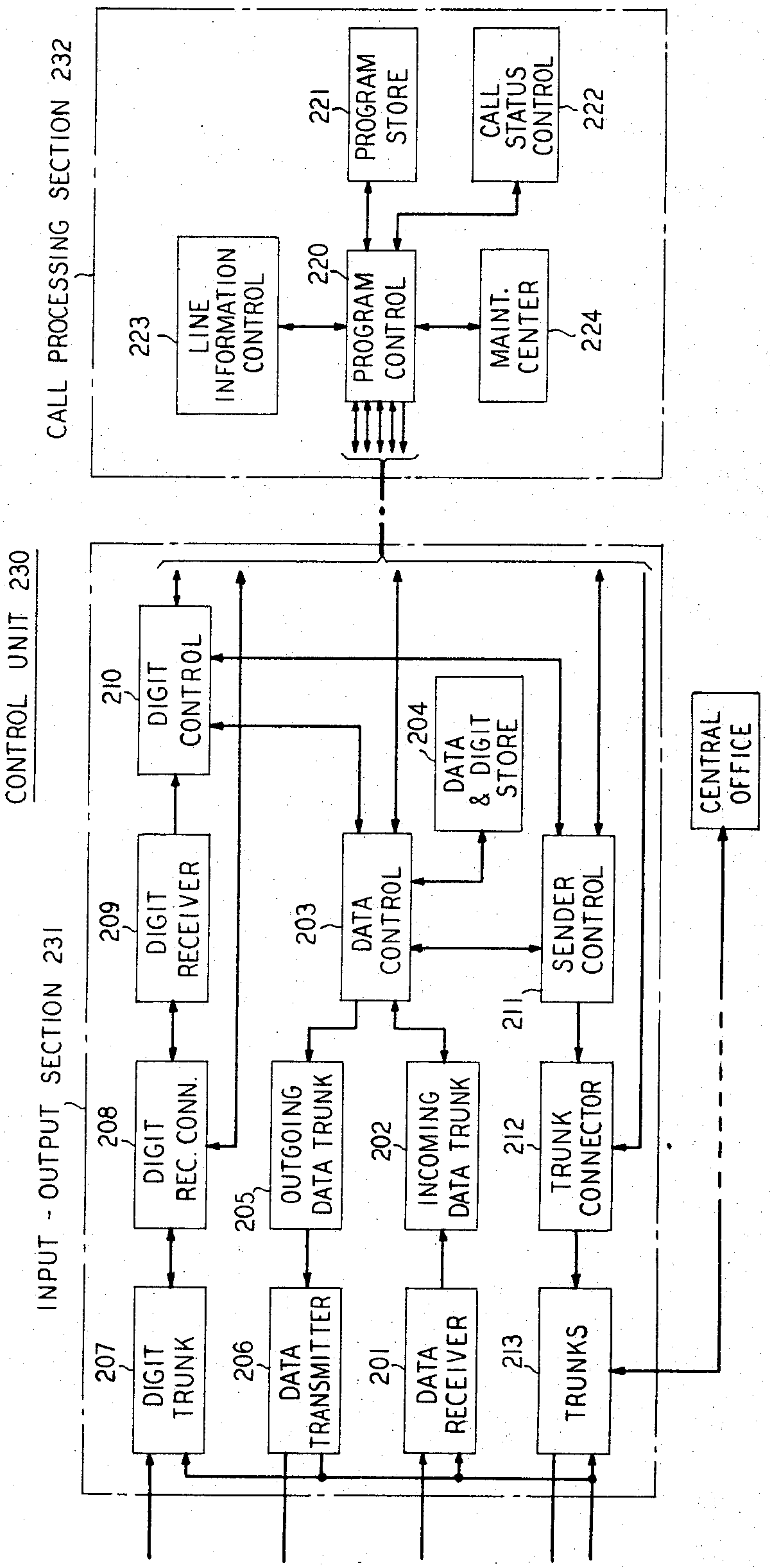

For example, consider the telephone system disclosed in the Seley et al. application, Ser. No. 252,797, filed Jan. 21, 1963, now U.S. Patent 3,268,669, issued Aug. 23, 1966. A block diagram representation of the Seley et al. private branch exchange is shown in FIGS. 3 and 4, these figures being identical to respective FIGS. 1 and 2 in the Seley et al. application. Control unit 230 serves a plurality of switch units 105. Two or more terminal stations in a switch unit may be interconnected to a common transmission bus 100 through respective line gates 101–101*n* on a time division basis. The control unit 230 directs call processing in all of the remotely located switch units. Supervisory and switching information is transmitted between the control unit and a switch unit over respective data send and data receive links. The switch unit informs the control unit over the data send link of all changes in the supervisory states of telephone lines, trunks, and keys of attendant console 250. The control unit then performs all of the decision-making tasks of call processing and transmits the required switching information to the switch unit over the data receive link, i.e., from the transmitter 206 to data receiver 112.

Between each switch unit and the control unit there are included a series of trunks for connecting a subscriber line through two time division gates 101, 102 and the common bus 100 to the trunk circuits 213, the trunk circuits being extended to a central office for establishing calls to the central office. The central office connects the trunks from one switch unit to the trunks of other switch units to establish inter-switch-unit calls.

The third type of communication facility between each switch unit and the control unit is a group of signaling trunks each of which connects a subscriber line when it first requests service through the two time division gates and the transmission bus to digit trunk circuit 207. Call signaling information, e.g., dial pulses, are transmitted over the signaling trunks to the control unit. This information is stored in a digit receiver 209 and is operated upon by call processing section 232 to determine the required switching connections.

When a switch unit party desires to establish a call, he first goes off-hook. Scanner 110 recognizes the service request and controls the transmission, by data transmitter 111, of the corresponding line number and the new supervisory state to the control unit via the data send link. The control unit then sets up a dialing connection. A message is sent to the switch unit via the receive data link specifying that the calling line be connected to a preselected signaling trunk. At the same time the control unit connects the digit trunk 207 which is connected to the selected signaling trunk, through a digit receiver connector 208, to a digit receiver 209. The digit receiver transmits dial tone to the calling line and the calling party proceeds to dial. Upon completion of dialing the control unit sends a message to the switch unit which removes the connection to the digit trunk and establishes instead a ringing connection to the called line wih audible ringing returned to the calling party. When the called party answers, an off-hook message is sent to the control unit which returns a message to the switch unit to terminate ringing and establish a talking connection.

The dial pulse digits are registered by a digit receiver 209. These digits are transferred to digit control 210. Data control 203 includes a scanner which scans digit control 210 for dial pulse digits and stores them in data and digit store 204. Data control 203 at the appropriate times enables the dial pulse data contained in data and digit store 204 to be transferred to the call processing section 232.

The method of our invention is ideally suited for use in the system of FIGS. 3 and 4. The same basic blocks of equipment are used but some of them may be simplified considerably. The digit receiver 209 may be nothing more than a conductor connecting a digit receiver connector 208 to the digit control 210. Digit receivers are no longer required to detect on-hook and off-hook transitions. All that is required is that a scan point connected to digit control 210 represent the stae of the signaling trunk at all times. Although in the Seley et al. system dial tone is provided by the digit receiver, a dial tone generator is now included in each switch unit and, under the control of control unit 230, dial tone is extended to the calling party and removed when the first transition from off-hook to on-hook takes place at the scan point in the digit receiver 209, i.e., when the first dial pulse is received. PS and LL bits for each scan point are included in data and digit store 204. The digit control 210 is simplified considerably since many of the logic operations performed by this unit are no longer required. When the scanner in data control 203 scans each scan point, the data control sends the respective PS bit to the digit control 210. The digit control includes AND gates such as AND gate 18 in FIG. 1 for forming the new PS bit. This bit is sent to data control 203 which under control of the system program changes the LL bit as required during the on-hook and off-hook scans, and changes the PS bit to a 1 at the end of each on-hook scan. During the digit scan the state of the scan point is scanned directly. Similarly, the AND gates may be omitted and the various bit values may be derived by utilizing the ordinary processing facilities of the control unit.

The block diagram system of FIGS. 3 and 4 is shown in greater detail in the above-identified Seley et al. application and is described therein. The modifications required in this system to practice the method of our invention will be apparent to those skilled in the art in the light of our present invention. Similar modifications may be made in other electronic switching systems known in the art to practice the method of our invention. For example, in systems where lines and/or trunks are scanned directly for on-hook and off-hook transitions and dial pulses, the same scan point may be used to derive all of the required information. By providing a suitable program to execute the steps in the method of our invention all of the required information may be determined from a scan point which merely indicates whether the respective line is on-hook or off-hook.

The invention has been described with reference to two particular embodiments. As described immediately above the method is ideally suited for program-controlled telephone switching systems, and depending on the order structures of various machines numerous programs for executing the steps of the invention may be devised. Similarly, although only one specially constructed circuit which is capable of executing the steps of our invention has been shown in FIG. 1, it is to be understood that numerous other specially designed circuits may be built to practice the method of the invention. For example, instead of providing three separate detectors, only one may be sufficient if additional gates are provided to direct a particular one of three possible inputs to the detector depending on the type of scan being performed, and additional gates are provided to direct the two outputs of the detector to the various parts of the system dependent on the particular type of scan being performed. Thus it is to be understood that although the invention has been described with reference to two particular embodiments numerous modifications may be made therein and other arrangements may be devised without departing from the spirit and scope of the invention.

What is claimed is:

1. A method for scanning a telephone line comprising the steps of (1) storing in a memory digit information, a present state bit and a last-look bit associated with said line, each of said bits being either a 0 or a 1, (2) scanning said line once in each successive time interval of predetermined duration to derive a scan bit, said bit being a 0 if the line is off-hook and a 1 if the line is on-hook, (3) forming the product of said present state bit and said scan bit to derive a new present state bit and storing said new present state bit in said memory in place of the present state bit stored therein, (4) up-dating said digit information in accordance with the value of said scan bit, (5) forming, in successive ones of said time intervals separated by a first predetermined number of time intervals, the complement of the logical union of said new present state bit and said last-look bit, (6) changing said last-look bit to a 1 for indicating that said line has gone from an idle to a busy state if the value of said complement is a 1, (7) forming, in successive ones of said time intervals separated by a second predetermined number of time intervals, the product of said new present state bit and said last-look bit, (8) changing said last-look bit to a 0 for indicating that said line has gone from a busy to an idle state if the value of said product formed in step (7) is a 1, and (9) changing said present state bit to a 1 after step (7) independent of the value of said product.

2. A method for scanning a telephone line comprising the steps of (1) storing in a memory a present state bit and a last-look bit associated with said line, (2) scanning said line periodically to determine if said line is off-hook or on-hook, (3) periodically forming a first function dependent upon the values of said present state bit and said last-look bit, (4) changing the value of said last-look bit to indicate that said line has gone from an idle to a busy state if said first function formed is a predetermined value, (5) periodically forming a second function dependent upon the values of said present state bit and said last-look bit, (6) changing the value of said last-look bit to indicate that said line has gone from a busy to an idle state if said second function formed is a predetermined value, (7) changing the value of said present state bit to a first predetermined value after said second function is formed in step (5) independent of the value of said second function, and (8) in response to step (2) changing said present state bit to a second predetermined value, opposite to said first predetermined value, if said line is off-hook.

3. A method for scanning a telephone line comprising the steps of (1) storing in a memory a present state bit and a last-look bit associated with said line, (2) scanning said line periodically to determine if said line is off-hook or on-hook, (3) up-dating said present state bit in accordance with the value of said bit and the state of said line determined in step (2), (4) forming a first function dependent upon the values of the up-dated present state bit and said last-look bit, (5) changing the value of said last-look bit to indicate that said line has gone from an idle to a busy state if said first function formed is a predetermined value, (6) forming a second function dependent upon the values of said up-dated present state bit and said last-look bit, (7) changing the value of said last-look bit to indicate that said line has gone from a busy to an idle state if said second function formed is a predetermined value, and (8) changing the value of said present state bit to a predetermined value after said second function is formed in step (6) independent of the value of said second function.

4. A method for scanning a telephone line in accordance with claim 3 wherein the time interval separating successive scans in step (2) is greater than the time interval during which the state of said line may change twice as a result of dial pulses appearing on said line and further including the step of (9) examining said line at a rate sufficient to detect all dial pulse transitions from on-hook to off-hook and changing the value of said present state bit to a predetermined value, opposite to the predetermined value defined in step (8), if said line is off-hook.

5. A method for scanning a telephone line comprising the steps of (1) storing in a memory a present state bit and a last-look bit associated with said line, (2) scanning said line periodically to determine if said line is off-hook or on-hook, (3) up-dating said present state bit in accordance with the value of said bit and the state of said line determined in step (2), (4) forming a first function dependent upon the values of the up-dated present state bit and said last-look bit, (5) changing the value of said last-look bit to indicate that said line has gone from one state to another state if said first function formed is a predetermined value, (6) forming a second function dependent upon the values of said up-dated present state bit and said last-look bit, (7) changing the value of said last-look bit to indicate that said line has gone from said other state to said one state if said second function formed is a predetermined value, and (8) changing the value of said present state bit to a predetermined value after said second function is formed in step (6) independent of the value of said second function.

6. A method for scanning a telephone line in accordance with claim 8 wherein the time interval separating successive scans in step (2) is greater than the time interval during which the state of said line may change twice as a result of dial pulses appearing on said line and further including the step of (9) examining said line at a rate sufficient to detect all dial pulse transitions from said one state to said other state and changing the value of said present state bit to a predetermined value, opposite to the predetermined value defined in step (8), if said line is in said other state.

7. A method for scanning a telephone line comprising the steps of (1) storing in a memory bit information representative of the condition of said line, (2) scanning said line periodically to determine if said line is off-hook or on-hook, (3) forming a first function dependent upon the value of said bit information and the state of said line determined in step (2), (4) changing said bit information to indicate that said line has gone from an idle to a busy state if said first function formed is a predetermined value, (5) forming a second function dependent upon the value of said bit information and the state of said line determined in step (2), (6) changing said bit information to indicate that said line has gone from a busy state to an idle state if said second function formed is a predetermined value, (7) changing said bit information in a first predetermined manner after said second function is formed in step (5) independent of the value of said second function, and (8) examining said line between successive performances of step (6) and changing said bit information in a second predetermined manner if said line is off-hook.

8. A method for scanning a telephone line comprising the steps of (1) storing in a memory a present state bit and a last-look bit associated with said line, (2) scanning said line periodically to determine if said line is off-hook or on-hook, (3) up-dating said present state bit in accordance with the value of said bit and the state of said line determined in step (2), (4) determining from the up-dated present state bit and said last-look bit if said line has gone from an idle to a busy state or from a busy to an idle state, (5) changing the value of said last-look bit in accordance with the determination made in step (4), (6) periodically changing the value of said present state bit to a first predetermined value independent of the state of said line, and (7) examining said line between successive scans performed in step (2) and changing said present state bit to a second predetermined value, opposite to said first predetermined value, if said line is in a predetermined condition.

9. A method for scanning a telephone line comprising the steps of (1) storing in a memory bit information representative of the condition of said line, (2) scanning said line periodically to determine if said line is on-hook or off-hook, (3) determining from the state of said line determined in step (2) and the value of said bit information if said line has gone from an idle to a busy state or from a busy to an idle state, (4) changing the value of said bit information in accordance with the determination made in step (3), (5) periodically changing said bit information in a first predetermined manner independent of the state of said line, and (6) examining said line between successive scans performed in step (2) and changing said bit information in a second predetermined manner if said line is in a predetermined condition.

10. A circuit for scanning a telephone line comprising means for representing a present state bit and a last-look bit associated with said line, means for examining said line in each successive time interval of predetermined duration to determine if said line is off-hook or on-hook, means for up-dating the present state bit in said representing means in accordance with the initial present state bit in said representing means and the operation of said examining means, means for registering digit information in accordance with successive operations of said examining means, first means for comparing the up-dated present state bit with said last-look bit in successive ones of said time intervals separated by a first predetermined number of time intervals, first means responsive to the operation of said first comparing means for changing said last-look bit to a first predetermined value to indicate that said line has gone from an idle to a busy state, second means for comparing said up-dated present state bit with said last-look bit in successive ones of said time intervals separated by a second predetermined number of time intervals, second means responsive to said second comparing means for changing said last-look bit to a second predetermined value to indicate that said line has gone from a busy to an idle state, and means responsive to each operation of said second comparing means for changing said present state bit to a second predetermined value.

11. A circuit for scanning a telephone line comprising means for representing a present state bit and a last-look bit associated with said line, means for examining said line in each successive time interval of predetermined duration to determine if said line is off-hook or on-hook, means for up-dating the present state bit in said representing means in accordance with the initial present state bit in said representing means and the operation of said examining means, first means for comparing the up-dated present state bit with said last-look bit in successive ones of said time intervals separated by a first predetermined number of time intervals, first means responsive to the operation of said first comparing means for changing said last-look bit to a first predetermined value to indicate that said line has gone from an idle to a busy state, second means for comparing said up-dated present state bit with said last-look bit in successive ones of said time intervals separated by a second predetermined number of time intervals, second means responsive to said second comparing means for changing said last-look bit to a second predetermined value to indicate that said line has gone from a busy to an idle state, and means responsive to each operation of said second comparing means for changing said present state bit to a second predetermined value.

12. A circuit for scanning a telephone line comprising means for representing a present state bit and a last-look bit associated with said line, means for examining said line periodically to determine if said line is off-hook or on-hook, first means for comparing said present state bit with said last-look bit, first means responsive to the operation of said first comparing means for changing said last-look bit to a first predetermined value to indicate that said line has gone from an idle to a busy state, second means for comparing said present state bit with said last-look bit, second means responsive to said second comparing means for changing said last-look bit to a second predetermined value to indicate that said line has gone from a busy to an idle state, means responsive to each operation of said second comparing means for changing said present state bit to a first predetermined value, and means for changing said present state bit to a second predetermined value responsive to the operation of said examining means.

13. A circuit for scanning a telephone line comprising means for representing a present state bit and a last-look bit associated with said line, means for examining said line periodically to determine if said line is off-hook or on-hook, means for up-dating the present state bit in said representing means in accordance with the initial present state bit in said representing means and the operation of said examining means, first means responsive to said examining means for comparing the up-dated present state bit with said last-look bit, first means responsive to the operation of said first comparing means for changing said last-look bit to a first predetermined value to indicate that said line has gone from an idle to a busy state, second means responsive to said examining means for comparing said up-dated present state bit with said last-look bit, second means responsive to said second comparing means for changing said last-look bit to a second predetermined value to indicate that said line has gone from a busy to an idle state, and means responsive to each operation of said second comparing means for changing said present state bit to a first predetermined value.

14. A scanning circuit in accordance with claim 13 wherein the time interval between successive operations of said examining means is greater than the time interval during which the state of said line may change twice as a result of dial pulses appearing on said line and further including means for changing said present state bit to a second predetermined value if said line is off-hook between successive operations of said examining means.

15. A circuit for scanning a telephone line comprising means for representing bit information indicative of the condition of said line, means for scanning said line periodically to determine if said line is off-hook or on-hook, first comparing means operative dependent upon the value of said bit information and the operation of said scanning means, first means responsive to said first comparing means for changing said bit information to indicate that said line has gone from an idle to a busy state, second comparing means operative dependent upon the value of said bit information and the operation of said scanning means, second means responsive to the operation of said second comparing means for changing said bit information to indicate that said line has gone from a busy state to an idle state, means for changing said bit information in a first predetermined manner responsive to the operation of said second comparing means, and means operative between successive operations of said second comparing means for changing said bit information in a second predetermined manner if said line is off-hook.

16. A circuit for scanning a telephone line comprising means for representing bit information indicative of the condition of said line, means for scanning said line periodically to determine if said line is off-hook or on-hook, first comparing means operative dependent upon the value of said bit information and the operation of said scanning means, first means responsive to said comparing means for changing said bit information to indicate that said line has gone from one state to another state, second comparing means operative dependent upon the value of said bit information and the operation of said scanning means, second means responsive to the operation of said second comparing means for changing said bit information to indicate that said line has gone from said other state to said one state, means for changing said bit information in a first predetermined manner responsive to the operation of said second comparing means, and means operative between successive operations of said second comparing means for changing said bit information in a second predetermined manner if said line is in a predetermined condition.

17. A circuit for scanning a telephone line comprising means for representing a present state bit and a last-look bit associated with said line, means for scanning said line periodically to determine if said line is on-hook or off-hook, means for up-dating said present state bit in accordance with the value of said bit and the operation of said scanning means, means for comparing the up-dated present state bit with said last-look bit to determine if said line has switched between idle and busy states, means responsive to said comparing means for changing the value of said last-look bit, means for changing periodically the value of said present state bit to a first predetermined value independent of the condition of said line, and means for changing said present state bit to a second predetermined value, opposite to said first predetermined value, if said line is in a predetermined condition.

18. A circuit for scanning a telephone line comprising means for representing bit information indicative of the condition of said line, means for scanning said line periodically to determine if said line is on-hook or off-hook, means for determining from said bit information and the operation of said scanning means if said line has gone from an idle to a busy condition or from a busy to an idle condition, means responsive to the operation of said determining means for changing the value of said bit information, means for changing periodically said bit information in a first predetermined manner independent of the state of said line, and means for changing said bit information in a second predetermined manner if said line is in a predetermined state between successive operations of said scanning means.

References Cited

UNITED STATES PATENTS 3,349,188 10/1967 Stirling et al.

KATHLEEN H. CLAFFY, *Primary Examiner.*

A. H. GESS, *Assistant Examiner.*

UNITED STATES PATENT OFFICE

CERTIFICATE OF CORRECTION

Patent No. 3,420,960 January 7, 1969

John Z. Jacoby et al.

It is certified that error appears in the above identified patent and that said Letters Patent are hereby corrected as shown below:

Column 1, line 19, "bit are stored in memory while the dial pulse in-" should read -- an last-look bits are combined wi current scanning --. Column 11, line 36, claim reference numeral "8" should read -- 5 --.

Signed and sealed this 16th day of December 1969.

(SEAL)
Attest:

Edward M. Fletcher, Jr.
Attesting Officer

WILLIAM E. SCHUYLER, JR.
Commissioner of Patents